July 4, 1950 W. E. WHITNEY 2,513,979
COMPRESSOR
Filed July 26, 1946 2 Sheets-Sheet 1
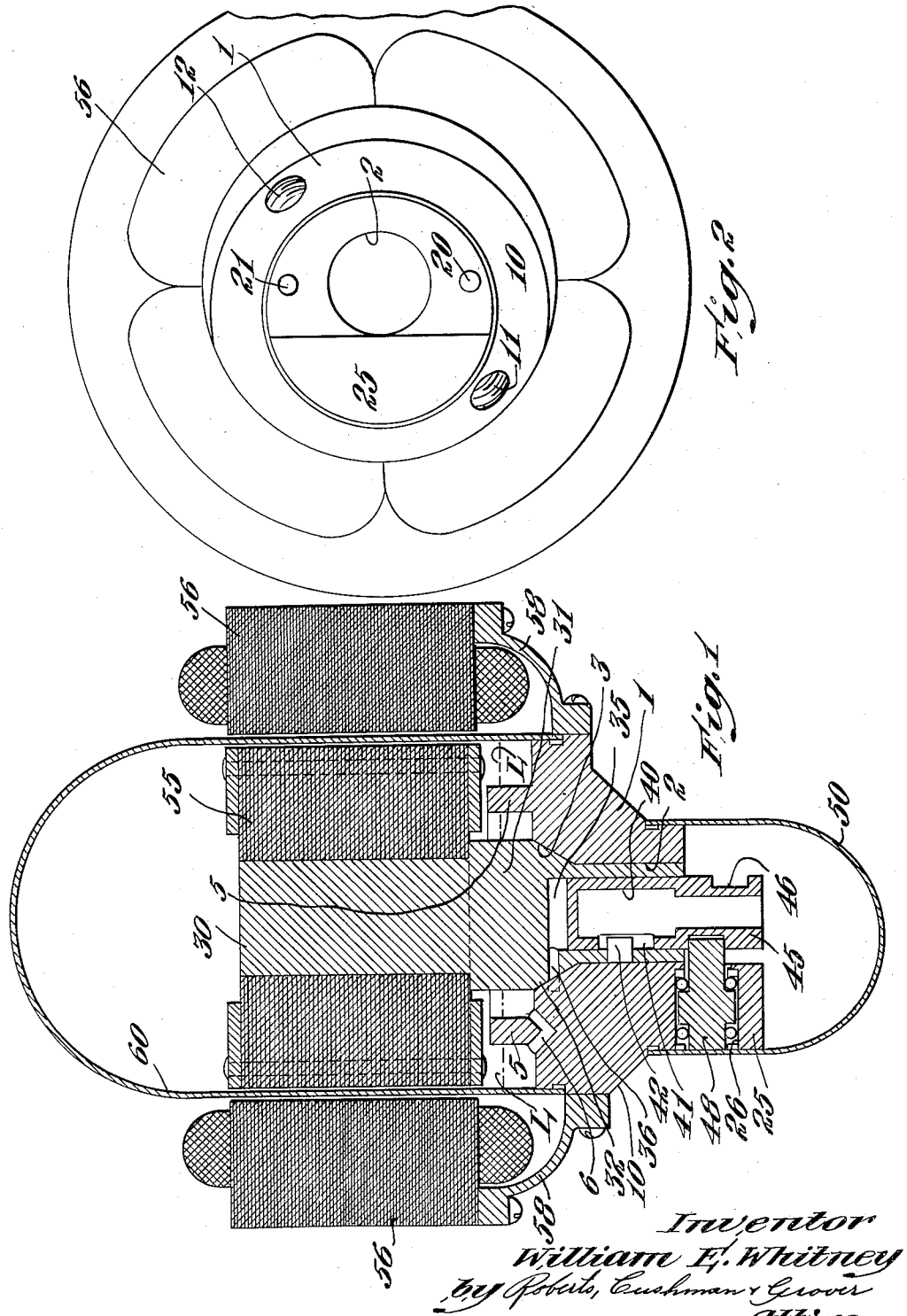
Inventor
William E. Whitney
by Roberts, Cushman & Grover
Att'ys.

July 4, 1950   W. E. WHITNEY   2,513,979
COMMPRESSOR

Filed July 26, 1946   2 Sheets-Sheet 2

Inventor
William E. Whitney
by Roberts, Cushman & Grover
Attys.

Patented July 4, 1950

2,513,979

UNITED STATES PATENT OFFICE 2,513,979

COMPRESSOR

William E. Whitney, Belmont, Mass., assignor to Stator Corporation, Providence, R. I., a corporation of Rhode Island Application July 26, 1946, Serial No. 686,384

4 Claims. (Cl. 230—58)

This invention relates to a pump such, for example, as a compressor for gaseous fluids and, as illustrative of its utility, the invention is herein shown and described with reference to a compressor suitable for a domestic refrigerating system.

The principal object of the present invention is to provide a compressor having a minimum number of parts and which is efficient and reliable in operation. More specific objects are to provide an electromotor compressor which presents a self-contained unit wherein all moving parts are sealed within a housing or casing and to provide a compressor which is self-lubricating and so designed that the piston cannot become oil-bound.

Further objects relate to various features of construction and will be apparent from a consideration of the following description and accompanying drawings, wherein:

Fig. 1 is a vertical section through a compressor constructed in accordance with the present invention;

Fig. 2 is a bottom view of the compressor with the lower casing, piston, shaft and associated parts removed;

Figure 3:
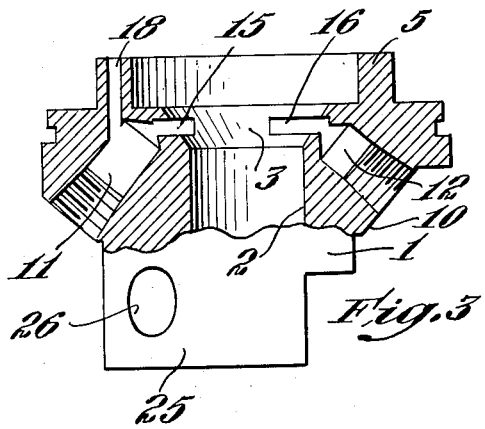
Fig. 3 is an elevation, with parts broken away and shown in section, of the stationary bearing member.

The embodiment herein shown comprises a stationary bearing member 1 of generally cylindrical shape having a vertically extending bore 2, the upper end of which terminates in a frusto-conical end 3 which defines a thrust bearing. The upper face of the bearing member is formed with an upstanding flange 5 surrounding the opening 3 and a V-shaped passage 6 provides a communication between the outer and inner zones defined by flange 5, as shown in Fig. 1.

Figure 4:
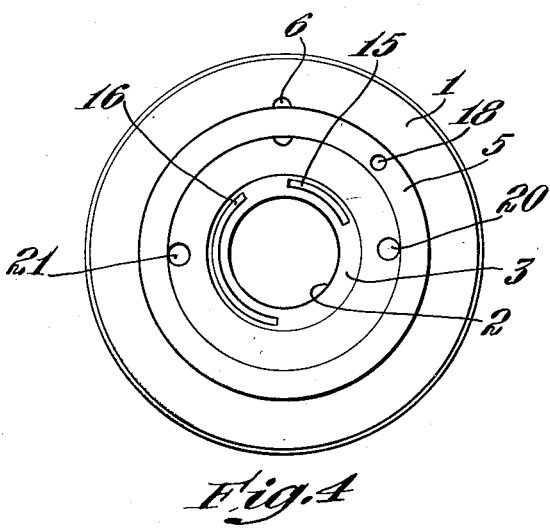
Fig. 4 is a top plan view of the bearing member.
Figure 6:
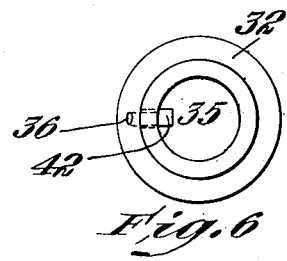
Fig. 6 is an end view of the shaft.

The underside of the bearing member is formed with a beveled shoulder 10 (Figs. 1, 2 and 3) and upwardly and inwardly inclined openings 11 and 12, respectively constituting exhaust and inlet ducts, are provided. The outer end of these ducts are threaded for connection with suitable pipes leading to the high and low pressure sides of a refrigerating apparatus or the like, and the inner ends of the ducts 11 and 12 communicate with elongate slots 15 and 16 which extend horizontally and terminate at the frusto-conical surface 3, as best shown in Figs. 3 and 4, the length of the slots depending upon the nature of the compressed medium and the ratio of compression. The slot 15 constitutes an exhaust port and, as shown in Fig. 4, has a length corresponding to an arc of the order of 65°, whereas the slot 16 provides an inlet port and has a length corresponding to an arc of the order of 150°.

A small vertically extending passage 18 (Fig. 3) runs from the inner end of exhaust duct 11 through the flange 5, the utility of which is hereinafter pointed out, and a pair of diametrically disposed passages 20 and 21 (Figs. 2 and 4) extend vertically from the upper face of the bearing member to its under surface, thereby providing oil and pressure equalizing ducts. The lower end of the bearing member 1 is formed with an approximately semi-cylindrical extension 25 (Figs. 1, 2 and 3) which is provided with a horizontally extending circular opening 26.

Figure 5:
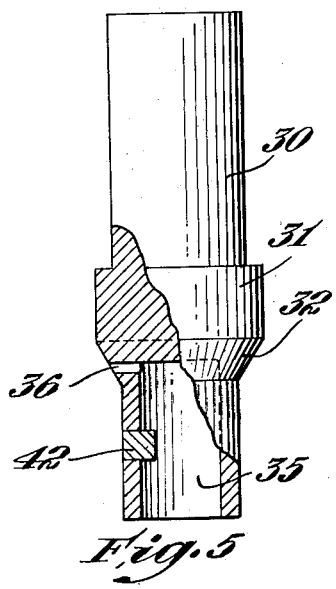
Fig. 5 is an elevation, with parts broken away and shown in section, of the rotary member or shaft.

The bearing member 1 rotatably supports a shaft 30, the central portion of which is formed with an enlargement 31 having a lower face 32 of frusto-conical shape so as to seat squarely on the thrust bearing surface 3, as shown in Fig. 1. The lower end of the shaft 30 is formed with an axial bore 35 which constitutes a pump or compression cylinder, the upper end of which is provided with a valve port 36 extending horizontally outwardly to the frusto-conical face 32, as shown in Figs. 1 and 5, so as to communicate with valve ports 15 and 16 when the shaft is rotated.

Figure 7:
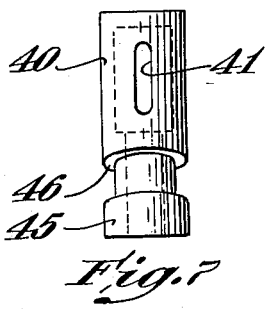
Fig. 7 is an elevation of the piston.

A piston 40 (Fig. 7) is slidably mounted within the cylinder 35 and the side wall of the piston is formed with a longitudinally extending slot 41 which receives a pin 42 projecting inwardly from the shaft or cylinder wall, thereby providing a pin and slot connection keying the piston to the cylinder so that it is free to reciprocate axially while being rotated. The lower end of piston 40 is formed with an extension 45 which projects below the end of the cylinder 35 when the piston is at its innermost position (Fig. 1) and this extension is formed with a diagonally extending reverse groove or thread 46, similar to the groove or thread of a cylindrical cam, which groove receives the inner end of a piston driving pin 48 rotatably mounted on ball-bearings within the opening 26 of extension 25, as shown in Fig. 1.

The construction and arrangement of parts are such that when the shaft 30 is rotated the pin 48 acting against the walls of groove 46 effects one complete reciprocation (upstroke and downstroke) of the piston for each complete rotation thereof. It will be noted that the design is such that the only mechanical part that actually reciprocates is the piston itself, thus reducing the reciprocating weight to a minimum.

The entire lower part of the pump is housed within a vapor tight casing 50 the upper end of which tightly fits about and is soldered, welded or otherwise suitably secured to the lower end of the body of the bearing member 1, as shown in Fig. 1. Oil or other suitable lubricant fills the casing 50 so that all moving parts, shaft 30, piston 40, and pin 45, are adequately lubricated.

In the embodiment herein shown the shaft 30 is driven by an alternating current electric motor of the capacitor or resistance start type, comprising a rotor 55 which is preferably the usual squirrel cage armature type fast to the upper end of shaft 30, as shown in Fig. 1, and surrounded by a stator or field 56 mounted on brackets 58 secured to the side wall of bearing member 1. A non-ferrous diaphragm casing 60, having a dome-like upper end, an open lower end and a cylindrical body portion, fits about the rotor 55 with a slight clearance and its lower end tightly fits about and is soldered, welded or otherwise secured to the upper end of the bearing member 1, thus cooperating with casing 50 in sealing all moving parts.

The entire unit is supported in any suitable manner so that the shaft 30 is at all times in substantially vertical position, it being noted that the weight of the shaft and rotor are relied upon to hold the bearing surface 32 firmly seated on the thrust bearing 3, although the shaft 30 may, under certain conditions, hereinafter noted, be forced upwardly away from bearing 3.

In operation oil fills the unit to the level indicated by the line L—L, and when the current is turned on, the motor rotates shaft 30 and thereby effects reciprocation of the piston 40 as previously explained. On the downstroke of the piston the port 36 at the inner end of the cylinder is swung into registry with valve port 16, thus enabling vapor to be drawn into the cylinder. At the completion of the downstroke, the port 36 disconnects with port 16 and remains closed during the major portion of the upstroke or compression cycle of the piston. During the latter part of the upstroke the port 16 swings into registry with the exhaust port 15 which permits the compressed vapor to be forced through outlet duct 11. A part of the compressed vapor, at least at the inital period of operation of the pump, is forced through the passage 18 (Fig. 3) into the housing 60, thus building up a pressure therein as great as that within the cylinder 35. The pressure thus created within the casing 60 is transmitted through the passages 20, 21 to the lower casing 50 so that the pressure of the vapor within the unit is equalized. Since the upper end of shaft 30 and the enlargement 31 present a greater area than that at the lower end of the shaft, the vapor pressure assists in maintaining the frusto-conical bearing securely seated on the thrust bearing. Moreover, the casings 50 and 60 provide in effect a pressure reservoir functionally comparable to a pressure dome in dampening vibrations.

During operation oil or lubricant is picked up by the reciprocating piston, the actuating pin 48 and the end of rotating shaft 30 so that all moving surfaces are well lubricated. In case a slug of oil becomes entrapped within the cylinder above the piston, the pressure exerted on such an oil slug would lift the shaft and rotor sufficiently to allow the oil to escape along the thrust bearing 3 into the zone within the annular flange 5. Accumulations of oil within the annular flange 5 would pass through the opening 6 and downwardly through openings 20, 21 so as to maintain the normal operating level.

While I have shown and described one desirable embodiment of the invention, it is to be understood that this disclosure is for the purpose of illustration and various changes and modifications may be made without departing from the spirit and scope of the invention as set forth in the appended claims.

I claim:

1. An electromotor pump comprising a bearing member having a vertical bore the upper end of which terminates in an annular portion defining a thrust bearing, a shaft projecting through said bore and formed with an enlargement seated on said annular portion, a rotor secured to the upper end of said shaft, a stator supported by said bearing member, a cylindrical casing having a closed end extending about the upper end of said shaft and rotor, the side wall of said casing being interposed between said rotor and stator with its lower end sealed to said bearing member, the lower end of said shaft having an axial bore defining a pump cylinder, a piston within said cylinder, valve ports at the inner end of said cylinder, a pin and slot combination between said piston and cylinder, the lower end of said piston having a continuous downwardly and then upwardly extending groove, and a pin carried by said bearing member and projecting laterally into said groove so as to effect reciprocation of said piston in response to rotation of said cylinder.

2. A pump comprising a stationary member having a bearing portion and a thrust bearing, a shaft rotatably supported by said bearing portion and having an enlargement engageable with said thrust bearing, one end of said shaft having an axial bore defining a pump cylinder, valve means at the inner end of said cylinder, a piston slidably mounted in said cylinder, means keying said piston and cylinder so that said piston may be reciprocated therein, the outer end of said piston extending beyond the outer end of said cylinder and being formed with a reversed helical threaded portion, a pin engaging said threaded portion so as to effect reciprocation of said piston in response to rotation of said cylinder, and a casing secured to said bearing member and extending about and enclosing the outer end of said piston and said pin.

3. A pump comprising a stationary bearing member having a cylindrical bearing surface and a thrust bearing surface, a rotatable member having bearing surfaces corresponding to those of said stationary member and rotatably supported thereby and axially movable relative thereto, one end portion of said rotatable member having an axial bore defining a pump cylinder, valve means at the inner end of said cylinder including a passage leading to the thrust bearing surface of said stationary bearing member, and a piston slidable axially within said cylinder in response to rotation of said rotatable member, the thrust bearing surfaces of the stationary and rotatable members normally being in engagement, but disengageable in response to pressure exerted on non-gaseous material accumulating at the inner end of said cylinder so as to permit the escape of said non-gaseous material through said passage.

4. A pump comprising a stationary bearing member having a cylindrical bearing surface and a thrust bearing surface formed with spaced intake and exhaust ports, a rotatable member having bearing surfaces corresponding to those of said stationary member and rotatably supported thereby and axially movable relative thereto, one end portion of said rotatable member having an axial bore defining a pump cylinder, valve means at the inner end of said cylinder arranged to communicate with said ports, and a piston slidable axially within said cylinder in response to rotation of said rotatable member, the thrust bearing surfaces of the stationary and rotatable members normally being in engagement, but disengageable in response to pressure exerted on non-gaseous material accumulating at the inner end of said cylinder so as to permit the escape of said non-gaseous material through said valve means and between said thrust bearing surfaces.

WILLIAM E. WHITNEY.

REFERENCES CITED

The following references are of record in the file of this patent:

UNITED STATES PATENTS

| Number | Name | Date |
|---|---|---|
| 1,135,617 | Reno et al. | Apr. 13, 1915 |
| 2,291,601 | Bancroft | Aug. 4, 1942 |

FOREIGN PATENTS

| Number | Country | Date |
|---|---|---|
| 244,018 | Great Britain | Dec. 10, 1925 |